United States Patent
Kursula et al.

(10) Patent No.: US 9,930,307 B1
(45) Date of Patent: Mar. 27, 2018

(54) PROJECTOR IMAGE ALIGNMENT

(71) Applicants: Mikko Kursula, Lempaala (FI); Veli-Pekka Vatula, Nokia (FI); Marko Bonden, Tampere (FI)

(72) Inventors: Mikko Kursula, Lempaala (FI); Veli-Pekka Vatula, Nokia (FI); Marko Bonden, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/278,132

(22) Filed: Sep. 28, 2016

(51) Int. Cl.
*H04N 9/31* (2006.01)
*H04N 5/33* (2006.01)

(52) U.S. Cl.
CPC ............ *H04N 9/3194* (2013.01); *H04N 5/33* (2013.01); *H04N 9/3147* (2013.01); *H04N 9/3182* (2013.01); *H04N 9/3185* (2013.01)

(58) Field of Classification Search
CPC ....... H04N 9/3194; H04N 9/3185; H04N 5/33
See application file for complete search history.

(56) References Cited

U.S. PATENT DOCUMENTS

| | | | | |
|---|---|---|---|---|
| 2007/0115361 | A1* | 5/2007 | Bolas | H04N 5/74 348/189 |
| 2008/0055554 | A1* | 3/2008 | Tubin | G03B 21/26 353/30 |
| 2008/0259223 | A1* | 10/2008 | Read | H04N 9/3147 348/745 |
| 2011/0211065 | A1* | 9/2011 | Furui | G03B 21/14 348/135 |
| 2013/0093805 | A1* | 4/2013 | Iversen | H04N 9/3126 345/690 |
| 2014/0104582 | A1* | 4/2014 | Mori | H04N 9/3185 353/30 |

* cited by examiner

*Primary Examiner* — Michael Teitelbaum
(74) *Attorney, Agent, or Firm* — International IP Law Group, P.L.L.C.

(57) ABSTRACT

An example system for projector image alignment. The system for projector image alignment can include a processor to compare a first calibration-pattern image projected by a first projector and at least a portion of a second calibration-pattern image projected by a second projector and generate a geometric model of an aligned image for display by both the first projector and the second projector. The processor can also send a first projector portion of the aligned image to the first projector based on the geometric model of the aligned image.

24 Claims, 7 Drawing Sheets

PROJECTOR IMAGE ALIGNMENT

TECHNICAL FIELD

The present techniques relate generally to the alignment of an image with a projector. More specifically, the present techniques relate to aligning images spatially and adjusting display settings for any number of projectors.

BACKGROUND ART

A projector can display an image onto a screen, wall, or other physical surface. The projection can involve passing light through a lens or series of lenses. The image displayed can be controlled by a processor and attached memory with instructions and images to be displayed.

BRIEF DESCRIPTION OF THE DRAWINGS

FIG. 3 is a diagram of an example projector matrix of synchronization ID values;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
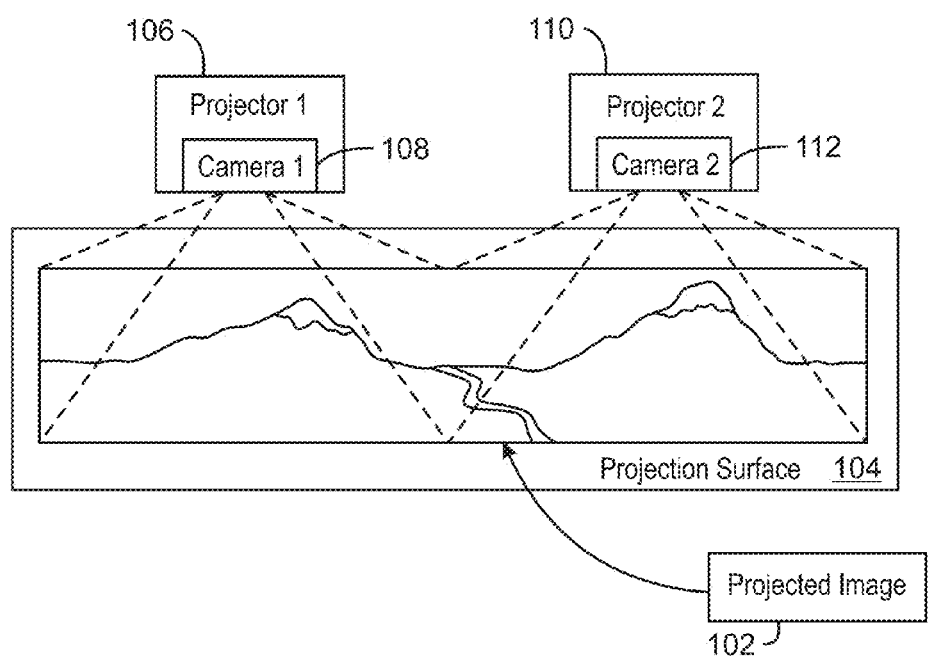
FIG. 1 is a schematic block diagram of an example set of projectors working together to project an aligned image.

Modern projection computer systems for large panorama-like images use more than one projector. Previous techniques do not provide an automatic method for aligning the images from multiple projectors, instead relying on manual image tuning and alignment by a user. Manual alignment by a user can be time-consuming and the process may have to be repeated anytime there is even a slight change in projector location as previous systems could not automatically realign and tune.

In the present technique, each image aligning projector can be equipped with a camera that points towards the projection direction to capture images. A camera can capture images or signal in the visible spectrum, infrared spectrum, or any other detectable spectrum emitted by a projector.

For example, an image aligning projector can periodically display an invisible, infrared, calibration-pattern image. The image aligning projector camera of each image aligning projector can then capture the calibration-pattern image from the same projector and from any other nearby image aligning projectors. From those calibration-pattern images, it is possible to automatically align the projection areas between physically distinct image aligning projectors.

Calibration-pattern images can also carry timestamp information used to synchronize projector image streams between multiple image aligning projectors. Temporal alignment of multiple image segments to be merged avoids image tearing effects. The use of image aligning projectors and a calibration-pattern image allows automatic tuning and adjustment of projected images even if the projector is moved during projection. In an example, the image aligning projectors can display and capture a calibration-pattern image once or more each cycle of frames for the image frame rate.

The presently disclosed techniques for image aligning projection can be used to carry sideband data in each calibration-pattern image. For example, the calibration-pattern image can include time-synchronization data. As image alignment can be carried out through the projection and capture of a calibration-pattern image, a differing brand, model, and vendor of image aligning projectors can be used when projecting and aligning the seamless image.

In the following disclosure, numerous specific details are set forth, such as examples of specific types of processors and system configurations, specific hardware structures, specific instruction types, specific system components, etc. in order to provide a thorough understanding of the present disclosure. It can be apparent, however, to one skilled in the art that these specific details need not be employed to practice the presently disclosed techniques. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the presently disclosed techniques.

FIG. 1 is a schematic block diagram of an example set 100 of projectors working together to project an aligned image 102. In this automatic alignment system, the aligned image 102 can be projected onto a projection surface 104. The projection surface can be any physical object, but commonly can include a white wall, a projector screen, rear projection screens, meshes, or other suitable surfaces. Projector 1 106, including camera 1 108, and projector 2 110, including camera 2 112, point their cameras towards the projection direction. Each camera of the projectors can have a camera field of view, which represents the area of space that the camera can sense images and signal. In an example, a camera's field of view can capture an additional area when compared to a projector image area. For example, camera 1 108, of projector 1 106, can have with a field of view larger than the area in which projector 1 106 can project an image.

In FIG. 1, the aligned image 102 is shown. This aligned image is an output image that can result from proper alignment and tuning. As discussed above, proper alignment can include projector 1 106 and projector 2 110 each periodically outputting a calibration-pattern image. While the calibration-pattern image can use a number of light wavelengths, in an example, the calibration-pattern image uses infrared light so that the calibration-pattern image is invisible to a user. The calibration-pattern image can be output in a way that covers either part of an image area on the projection surface 104, or is output in a way that covers the entirety of the projection surface 104.

In an example, the output image area of projector 1 106, overlaps with the output image area of projector 2 110 along at least one edge of the output image. The cameras of projector 1 106 and projector 2 110 take pictures of the calibration-pattern image and use that information to align the output images and to perform any geometry corrections desired. In an example, geometry corrections can include accounting for warping due to an angle of the projector relative to the projection surface 104. The geometry correction can also include accounting for a relative size of the projected image, the shape of the projection surface itself, and other similar causes of geometric altering of images. The image alignment process can run continuously with each projectors calibration-pattern images being displayed and captured to allow each projector to adapt alignment to changing conditions.

Projectors can include a camera rotation mechanism, an image display rotation mechanism, or other rotation mechanisms that allow image capture components and projection displays to rotate vertically, horizontally, or depth wise as needed for alignment and capture of images. For example, if a camera of a projector does not capture any portion of a calibration-pattern image in an expected region of a projection surface 104, the projector can use a camera rotation mechanism to find the nearest projector calibration-pattern image. Once the calibration-pattern image is found, the alignment process can begin by orienting the projector to that direction. Additional modification can include use of panoramic or warping lenses and cameras, such as a fisheye lens or a 360-degree camera, to expand a camera field of view or a projector image display area.

Figure 2:
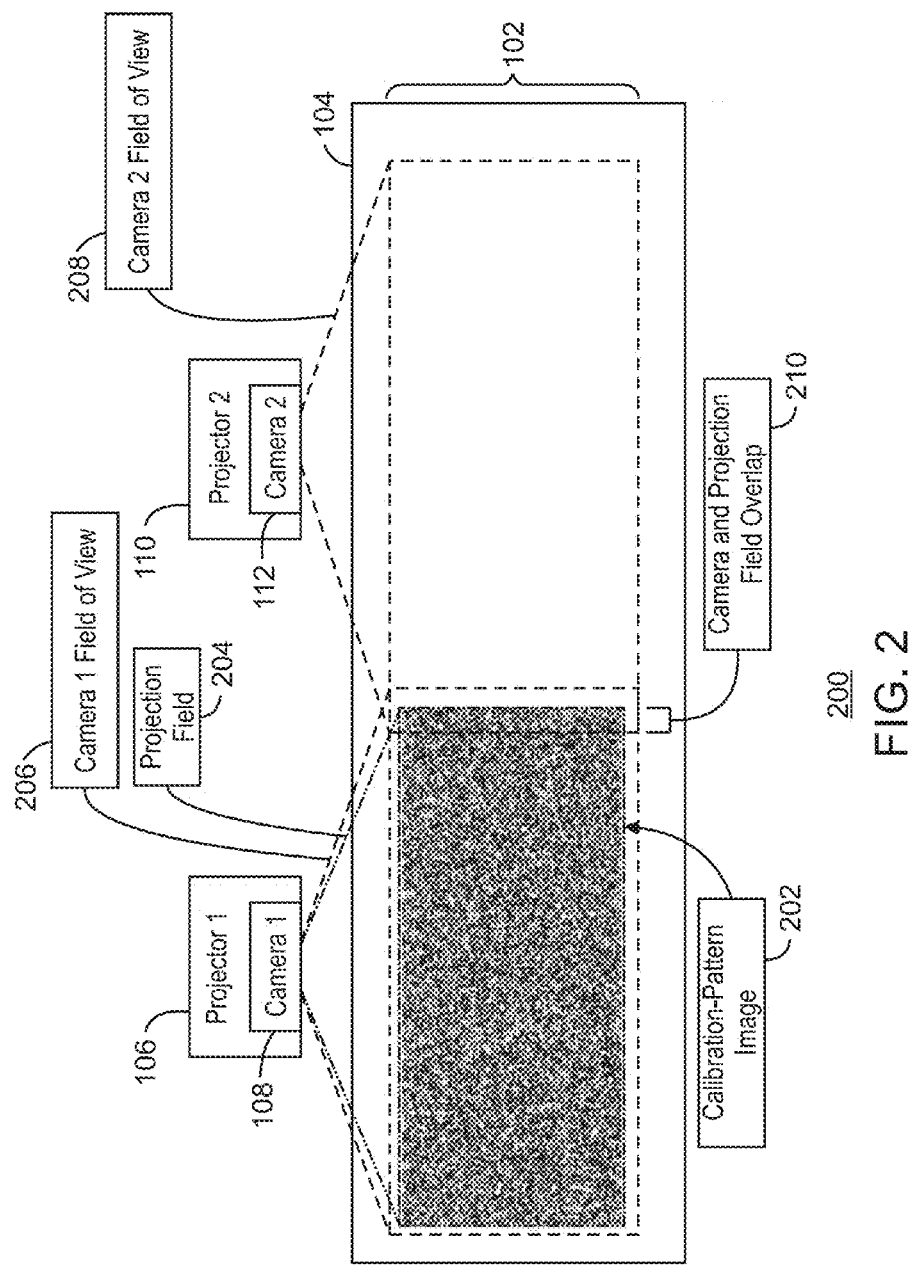
FIG. 2 is a schematic block diagram of an example first projector transmitting a calibration-pattern image with both the first and second projector capturing the calibration-pattern image transmitted.

FIG. 2 is a schematic block diagram 200 of an example first projector transmitting a calibration-pattern image with both the first and second projector capturing the calibration-pattern image transmitted. Like numbered items are as described in FIG. 1.

To provide a reference point for this alignment system, the user points a projector to the top-left corner of the desired projection surface 104. By positioning the projector to the top-left corner of the projection surface 104, the other projectors can find and align to the image being displayed by this first projector. While an anchoring or reference direction is disclosed here as top-left corner of a projection surface 104, any other combinations of directions could work with a suitable adjustment of alignment ordering of the subsequently aligning projectors.

As disclosed herein, an alignment system with a hierarchy of projectors keying their alignment to the projector above it and to its left, results in the first reference projector, to be placed by the user, being located at the top left of the projection surface 104. In another example, if the number of projectors were to align their images based on the projected image below and to the right from other projectors, then the projected image that all others aligned to would be the bottom-right most projected image on the projection surface 104. As used in the examples herein, the projected images refer to the projected images both above and to the left for alignment. Accordingly, the initial projector image for reference, in this example, is positioned to be displayed in the upper-leftmost corner of the projection surface.

While, in FIG. 2, two projectors are shown, the techniques disclosed herein are not limited to two projectors. After positioning projector 1 106 to project towards the upper-leftmost region of the projection surface 104, projector 1 106 outputs a calibration-pattern image 202.

The calibration-pattern image 202 can be displayed in the projection field 204 of projector 1 106. Camera 1 108 can capture images and signals within the camera 1 field of view 206. As seen in FIG. 2, the camera 1 field of view 206 included additional area when compared to than the projection field 204 of projector 1 106, and therefor is also larger than the calibration-pattern image 202 projected by projector 1 106. Camera 2 112 can have a camera 2 field of view 208. As positioned, there is overlap in the camera 2 field of view 208 and the projection field 204 showing the calibration-pattern image 202. As both camera 1 108 and camera 2 112 can see portions of the calibration-pattern image 202, both capture the calibration-pattern image 202 from the perspectives of their respective projectors. The captured calibration-pattern image 202 can be used by projector 2 110 to align itself to the image shown by projector 1 106. In an example, the alignment can be by a matching of shapes identified from the calibration-pattern image to an image calibration database stored in projector 2 110.

For further alignment, projector 2 110 can output the same calibration-pattern image shown by projector 1 106. Projector 1 106 and projector 2 110 can both capture the calibration-pattern image 202 projected by projector 2 110 using their cameras. Based on the location of the projection field 204 of projector 2 110, camera 1 108 may see the projected calibration-pattern image edge closest to a projector 2 110 image area. Alignment based on both projectors capturing calibration-pattern images can include each projector separately calculating an alignment of the images captured. Each projector can analyze the captured calibration-pattern image pictures to find the area where nearby projector images overlap. Calibration-pattern images can vary for circumstance or can vary over time after an initial alignment in order to better fine tune geometrical corrections and to compensate for any projector tilt/leveling errors so that pixel-accurate image alignment is achieved.

In an example, each projector can calculate a whiteboard 3D surface shape from the calibration-pattern images to identify a corresponding alignment. In whiteboard 3D surface shape alignment, geometrical corrections can be made for instances when projector is not in a right angle direction towards the projection surface 104, or if the projection surface 104 is not flat. The use of whiteboard 3D surface shape alignment can be used and applied in geometrical correction for subsequent calibration-pattern images. In an example, the projection surface 104 can be curved or folded in a symmetric or asymmetric way. Based on the detected calibration pattern-images detected by the cameras, the whiteboard 3D surface shape can allow alignment of a seamless image to a curved or folded projection surface 104.

Once an initial geometric alignment is found between projector 1 106 and projector 2 110, an image edge can be established by the projectors sharing edges. In an example, the image edge between images shown by projector 1 106 and projector 2 110 are exactly in the middle of the overlapping area of each projection field 204. When displaying images rather than calibration-pattern images, projectors can use anti-aliasing to smooth and hide the edge if the edge is at small angle relative to a projector pixel matrix.

As discussed above, there can be a reference projector that a second or subsequent projector references. As part of the calibration process, the projector can determine if there are any projectors in the top direction or the left direction and align to those images accordingly. If no projector image is detected in a top or left direction, then the projector can use default settings without aligning to another image.

The calibration and alignment between the projectors are repeated upon start-up of both projectors, upon manual activation of the aligning process, and continuously during image display. In some examples, this is possible through using infrared displaying projections for the calibration-pattern image while an image in the visible light spectrum is being displayed otherwise. In another example, the calibration-pattern image 202 can be entirely black white pixel arrangements, where the pixel arrangements and values are defined by specific algorithms that indicate shape or setting. In an example, a calibration-pattern image 202 can include a periodic nature of its internal pixel arrangement so that e.g. each 32×32 pixel segment has two-dimensional autocorrelation of unit impulse. Such pixel coding may help in recognizing the calibration pattern in difficult conditions of alignment of multiple projectors. Pre-established patterns for the calibration-pattern image result in very accurate location calibration even when a camera of a projector can only see a portion of the calibration-pattern image.

Figure 3:
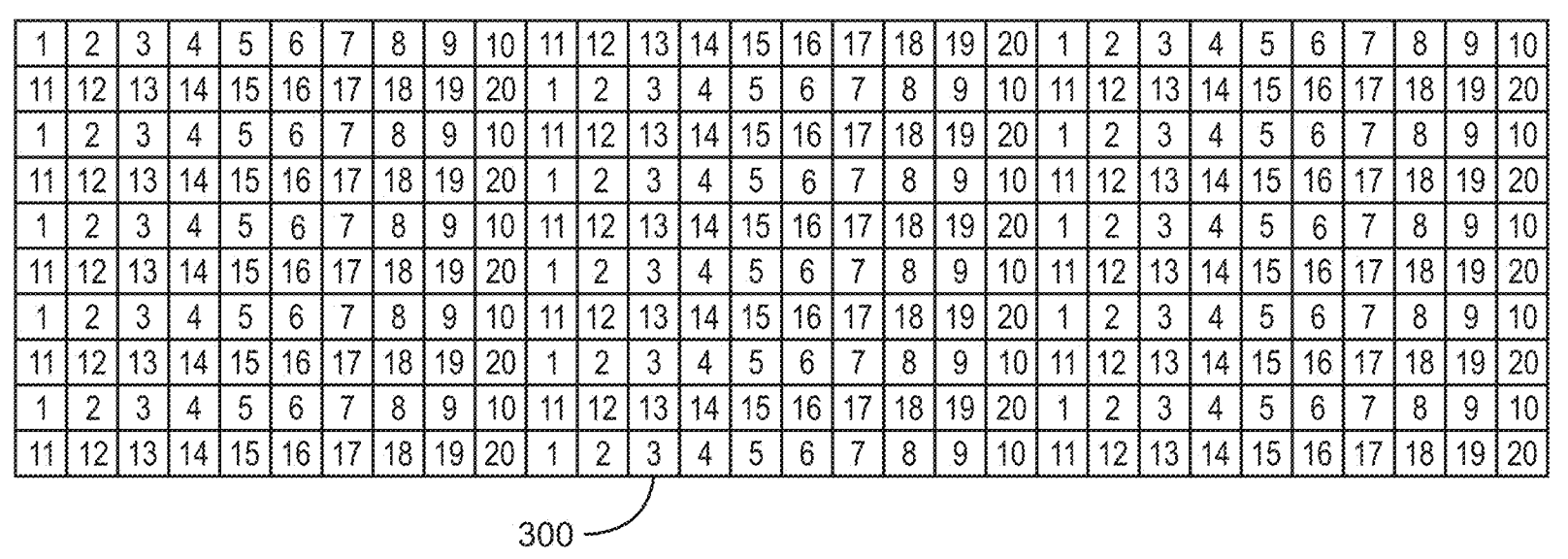

FIG. 3 is a diagram of an example projector matrix 300 of synchronization ID values. As used herein, a projector matrix 300 can refer to the spatial arrangement of each projector or projected image of a projector. FIG. 3 shows an arrangement of three hundred projectors or projected images in a grid like matrix corresponding to the actual displayed image location of each projector image. While use of three hundred projectors may currently be unlikely, it is contemplated herein that each projector may be a small device of a user such as a mobile device, wearable, or other suitable light emitting device that when combined with many other nearby projection capable devices, could create a larger projected screen through alignment. To aid in understanding the context of the projector matrix 300, consider projector 1 106 and projector 2 110 from FIG. 1 and FIG. 2. In FIG. 3, these two projectors could be projecting images located in the upper-leftmost area numbered with synchronization ID values of 1 and 2, respectively. The remaining numbers could be additional projectors that are attempting to align themselves with the image shown by projector 1 106 and projector 2 110.

The numbers shown in each box 1-20 are examples of synchronization ID values that can be used to help in organizing and ordering the projector images. While 20 synchronization ID values are used here, greater or fewer synchronization ID values can also be used. In an example, the number of synchronization ID values can be equal to the number of frames used by a projector in a second, e.g. the projector frame rate.

Using synchronization values can allow automatic synchronization and aid in alignment by following rules, which can be included in each projector or sent to each projector. Each projector has synchronization ID value that defines its position in a multi-projector system. The generation of this synchronization ID value can occur at system power-up when a projector can use random integer values between 1 and 20, for example. Each projector can transmit its synchronization ID value as part of the calibration-pattern image to other surrounding projectors with cameras that can detect these calibration-pattern images and their included synchronization ID values. The transmission of a synchronization ID value can be through use of a sideband transmission functionality of the calibration-pattern image. In one example, sideband information can be coded and transmitted through the information being coded to black and white calibration-pattern image or to an infrared light calibration-pattern image in the form of a dot matrix. The coding of the sideband information can include the coding of the synchronization ID value, for example, however additional information can be encoded in the sideband information of the calibration-pattern image. Based on the sideband information and the coding output, a predefined scrambling code can be used so that the sideband information, such as the synchronization ID value of a projector, can be received by a second projector using a camera to capture the calibration-pattern image even if multiple images overlap during synchronization start-up phase.

For start-up calibration and alignment, projectors can use their cameras to read nearby images to attempt to identify a neighbor projector synchronization ID value from the calibration-pattern image pictures. If projector does not see any projector image on the top or left direction, it can set its own synchronization ID value 1. If projector sees projector image in the left side, it uses synchronization ID value of the left projector+1. If projector sees a projector image in the top side, it uses synchronization ID value of the top projector+10. If the ID value is larger than 20, reduce the value by 20. Based on this synchronization ID value identification process, the projectors can identify where they are located within a projector matrix 300. As discussed above, additional ranges can be used for synchronization ID values, however, in this example, the synchronization ID value are tied to 1-20, but can also be as high as a frame rate of the projectors combining images, or even higher. For example, if a max ID value would be 40, then in a 20 frame per second (fps) projector system the synchronization picture is displayed once per every two cycles, or once every two seconds.

Once the projectors and projector images are ordered in the projector matrix 300, each projector displaying an image can use a frame counter to count image frames of the aligned image from 1 to 20. The projectors can then transmit the calibration-pattern image when the frame counter value is equal to the projector synchronization ID value. This ensures that calibration-pattern images from different projectors do not overlap as projectors with similar synchronization ID values have been arranged and numbered in the projection matrix 300 to be apart from each other during calibration. The distance during alignment through calibration images can help in avoiding overlap of calibration-pattern images that are displayed and captured by each device. Based on the transmission of sideband information through the synchronization ID value area and coding of information in the calibration-pattern image, projectors can also synchronize the frame counters in each projector so that displayed images can be correctly timed and can avoid tearing.

The above calibration pattern of ordering and alignment through calibration-pattern images detected by a camera from a projected image can be repeated during the display of images. In an example, the repetitions and adjustments can be made based on the frame rate of the projector. Assuming a frame rate of 20, a projector or series of projectors may restart the calibration process after every 20th Red-Green-Blue (RGB) sequence using infrared light. Longer and shorter times or numbers of sequences can be used to determine the next calibration update or restart and need not be based on a cycle of RGB sequences. If the calibration-pattern image is being displayed in sequence with the display of the aligned image, the calibration-pattern image duration can be shorter than a normal RGB image so that the sequence timing remains continuous. For example, if there are 20 frames a second, and one of those frames includes a calibration-pattern image, the image in that frame can be shorted and the calibration-pattern image can take up a fraction of that frame, rather than using its own frame and leading to the removal of image content from display. Timing the projection of calibration-pattern images based on a frame rate could indicate a number of synchronization ID values could be used before repeating.

If the projectors are using infrared projection techniques and a camera attuned for infrared frequencies, then the calibration-pattern image can be displayed simultaneous with the image being displayed and detected by the infrared detecting camera. In an example, the calibration-pattern image is projected at known intervals to allow multiple projectors to synchronize their output streams based on the detection of the calibration-pattern image and any relevant sideband information.

Figure 4:
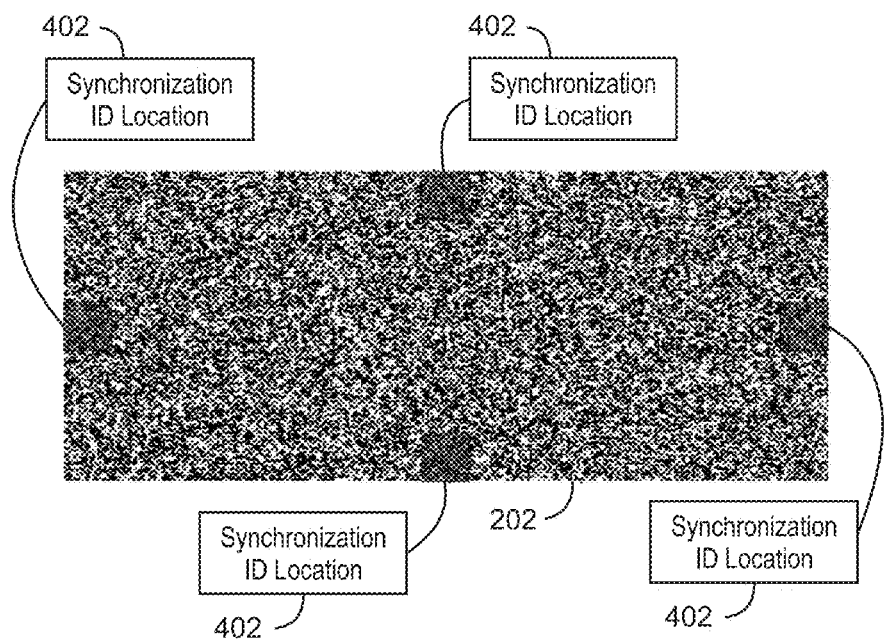
FIG. 4 is a schematic block diagram of an example calibration-pattern image with synchronization ID value locations.

FIG. 4 is a schematic block diagram 400 of an example calibration-pattern image 202 with synchronization ID value locations 402. Like numbered items are as described with respect to FIG. 2.

As discussed above, sideband information can be sent through coded regions of the calibration-pattern image 202. The sideband information can include the synchronization ID value in a synchronization ID value location 402. In FIG. 4, multiple locations are shown, although some locations may not be used. In an example, these locations may include not only image location and timing alignment, but also image brightness and color balance information for particular projector. The sideband information conveyed through a calibration-pattern image in one of the synchronization ID value locations can include numerical or coded data to convey values for brightness and color. In another example, a camera of a projector may monitor a nearby displayed image, after image alignment, and determine a variance in image quality and other characteristics such as color or brightness.

Whether conveyed through sideband information or through direct detection, a projector can update the image brightness and color balance so that it matches to the projector image in the top and in the left directions so that there is no discontinuity in the brightness or color balance. Using a similar method and hierarchy strategy as used for ordering and aligning the projector matrix 300 of FIG. 3, the entire projector matrix can be aligned for geometric warping, timing synchronization, and color and brightness differences according to a clear direction of reference. In the present example, the reference direction and anchor point can be based on the projector in the upper left corner of the projector matrix. Further, many lighting and color adjustments can be made based on the anchor or top-ordered projector. Accordingly, when a projector detects that it is an anchor projector, the projector may adjust its settings so that the maximum brightness is a percentage lower than one-hundred percent to allow other projectors to adjust brighter or darker to match it, rather than being set to one-hundred percent and thereby eliminating adjustment range above those values.

Figure 5:
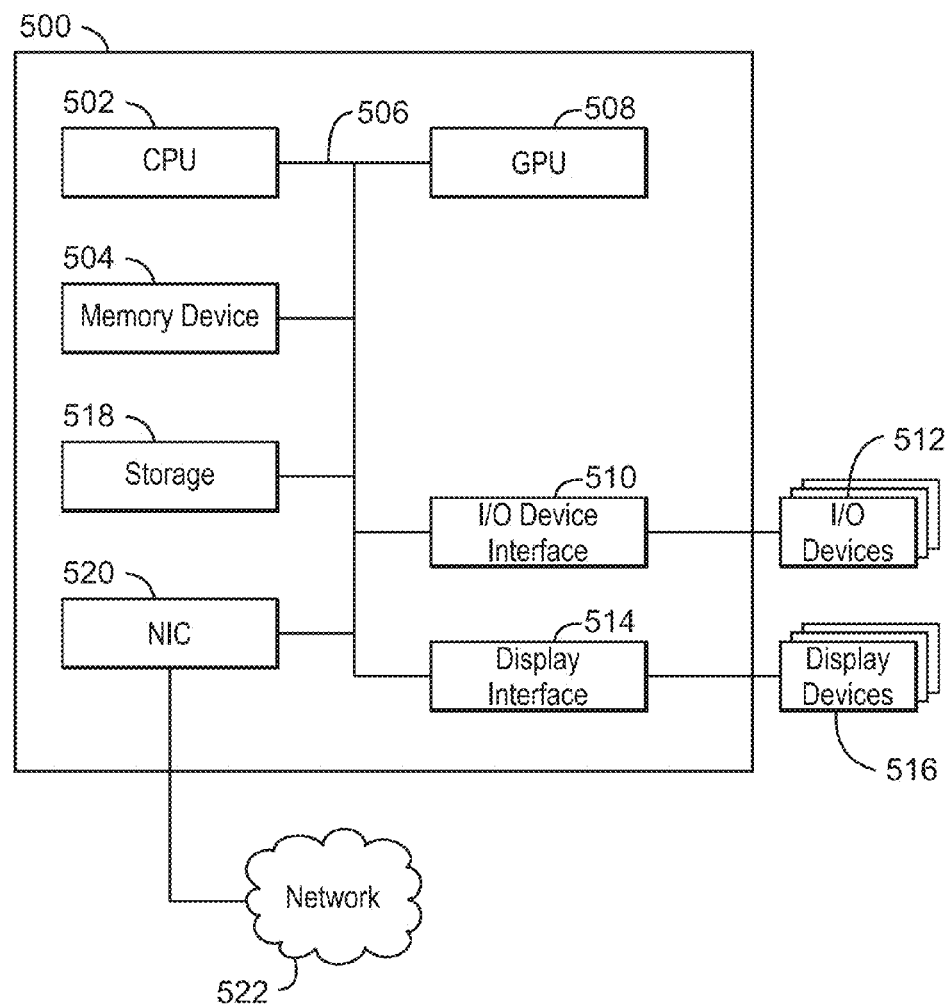
FIG. 5 is a block diagram illustrating an example computing device for projector image alignment.

FIG. 5 is a block diagram illustrating an example computing device for projector image alignment. The computing device 500 may be, for example, a laptop computer, desktop computer, tablet computer, mobile device, or server, among others. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. The memory device 504 can include random access memory (RAM), read only memory (ROM), flash memory, or any other suitable memory systems. For example, the memory device 504 may include dynamic random access memory (DRAM).

The computing device 500 may also include a graphics processing unit (CPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM).

The CPU 502 may also be connected through the bus 506 to an input/output (I/O) device interface 510 configured to connect the computing device 500 to one or more I/O devices 512. The I/O devices 512 may include, for example, a keyboard and a pointing device, wherein the pointing device may include a touchpad or a touchscreen, among others. The I/O devices 512 may be built-in components of the computing device 500, or may be devices that are externally connected to the computing device 500. In some examples, the memory 504 may be communicatively coupled to I/O devices 512 through direct memory access (DMA). The I/O devices 512 may also be a camera for detecting displayed calibration-pattern images. The camera can be a camera detecting visible light, infrared light, or any combination of electromagnetic detectable signals.

The CPU 502 may also be linked through the bus 506 to a display interface 514 configured to connect the computing device 500 to a display device 516. The display device 516 may include a display screen that is a built-in component of the computing device 500. The display device 516 may also include a computer monitor, television, or projector, among others, that is internal to or externally connected to the computing device 500. The projector may display a stored calibration-pattern image to a projection surface.

The computing device also includes a storage device 518. The storage device 518 is a physical memory such as a hard drive, an optical drive, a thumbdrive, an array of drives, or any combinations thereof. The storage device 518 may also include remote storage drives.

The computing device 500 may also include a network interface controller (NIC) 520. The NIC 520 may be configured to connect the computing device 500 through the bus 506 to a network 522. The network 522 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

In an example, display device 516 can be a projector to display a stored calibration-pattern image in a projection field on a projection surface. The I/O device 512 can be a camera to capture at least a portion of a first displayed calibration-pattern image displayed on the projection surface where the camera can capture at least a portion of a second displayed calibration-pattern image in response to a second projector displaying the stored calibration-pattern image. The CPU 502 can compare the first calibration-pattern image and a second calibration-pattern image. Based on the comparison, a CPU 502 can execute instructions stored in the aligned image generator 524 stored in storage 518 to generate a geometric model of an aligned image for display by both the first projector through the display device 516 and the second projector. In an example, the display devices 516, being used as the first projector can be used to display a first projector portion of the aligned image based on the geometric model of the aligned image generated by the CPU 502.

In an example of this system, the stored calibration-pattern image can include sideband information encoded in a pattern of the stored calibration-pattern image. This sideband information could include a synchronization ID value, a color setting, or a brightness setting of the aligned image to be projected.

In an example, of this system, the display device 516 specifically a projector can identifies itself as an anchor projector. Further, the system may alter the stored calibration-pattern image including an anchor identification in response to the camera returning zero identifications of additional projected images.

In an example, the I/O device 512, specifically, the camera can include a camera-rotating mechanism for the first display device, including a projector that rotates to search for a projected image on a projection surface. The camera can also capture a calibration pattern-image in a camera field that is larger than the projection field of the first projector. In an example, the first projector can display the calibration-pattern image using infrared light and the camera to capture infrared light for use in generating the geometric model of the aligned image. Further, the camera may include the use of a wide-angle lens.

The system disclosed in FIG. 1, may also include a frame rate of the first projector and a refresh time that restarts an alignment by the first projector, camera, and processor in response to the frame rate completing a cycle.

The block diagram of FIG. 5 is not intended to indicate that the computing device 500 is to include all of the components shown in FIG. 5. Rather, the computing device 500 can include fewer or additional components not illustrated in FIG. 5, such as additional USB devices, additional guest devices, and the like. The computing device 500 may include any number of additional components not shown in FIG. 5, depending on the details of the specific implementation. Furthermore, any of the functionalities of the CPU 502 may be partially, or entirely, implemented in hardware and/or in a processor.

Figure 6:
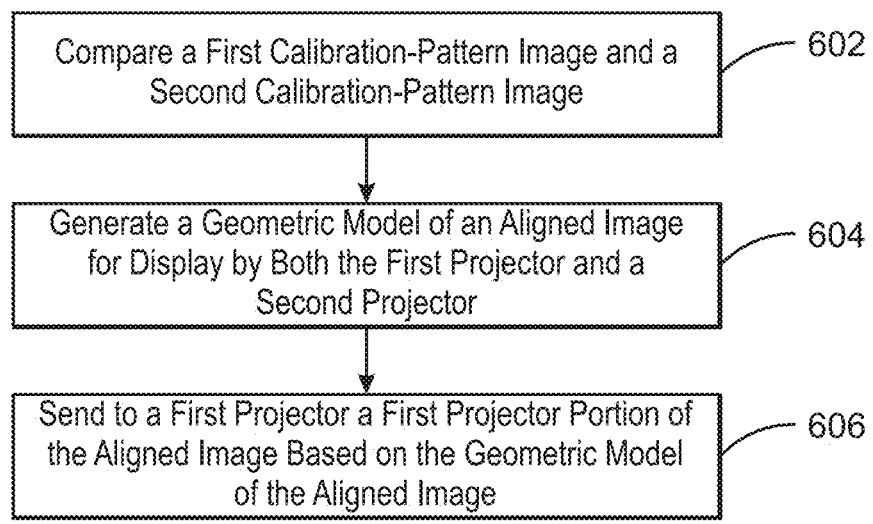
FIG. 6 is a flow chart illustrating a method for projector image alignment.

FIG. 6 is a flow chart illustrating a method 600 for projector image alignment. The example method is generally referred to by the reference number 600 and can be implemented using the system 500 of FIG. 5 above.

At block 602, a processor can compare a first calibration-pattern image and a second calibration-pattern image. These first calibration-pattern images can come from projectors. In an example, a first projector can initially display a stored calibration-pattern image in a projection field on a projection surface. The stored calibration-pattern image can include sideband information encoded in a pattern of the stored calibration-pattern image. The sideband information can include a synchronization ID value, a color setting, a brightness setting, or other similar adjustable elements of the displayed images relating towards their appearance or alignment and location. The frame rate of the first projector can be used to determine a refresh time that restarts an alignment by the first projector, a camera, and a processor in response to the frame rate completing a cycle.

At block 604, the processor can generate a geometric model of an aligned image for display by both the first projector and a second projector. In an example, a camera captures at least a portion of a first displayed calibration-pattern image displayed on the projection surface, the camera to capture at least a portion of a second displayed calibration-pattern image in response to a second projector displaying the stored calibration-pattern image. In an example, the projector identifies itself as an anchor projector and alters the stored calibration-pattern image including an anchor identification in response to the camera returning zero identifications of additional projected images. In an example, the camera can include a camera-rotating mechanism to search for a projected image on a projection surface. In an example, the camera can capture a calibration pattern-image in a camera field that is larger than the projection field of the first projector. The first projector may display the calibration-pattern image using infrared light, and further, the camera may capture the infrared light for use in generating the geometric model of the aligned image. The camera can also use wide-angle lenses like fish eye lenses and panoramic cameras.

At block 606, the processor can send to a first projector a first projector portion of the aligned image. In an example, the first projector can display a first projector portion of the aligned image based on the geometric model of the aligned image generated by the processor.

Figure 7:
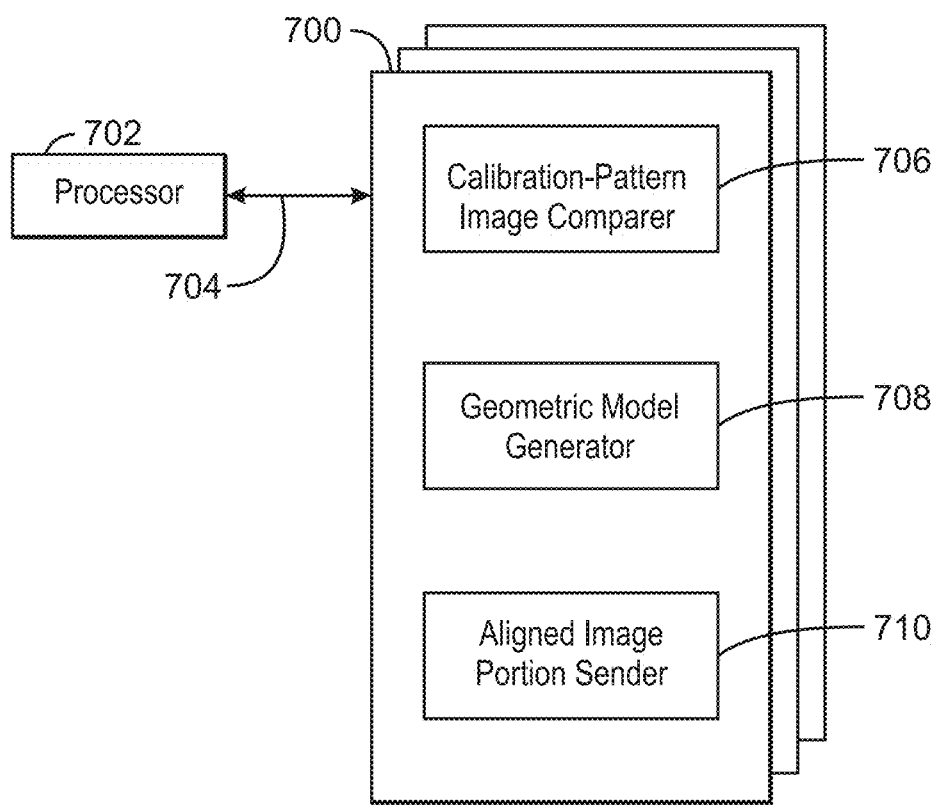
FIG. 7 is a block diagram showing computer readable media that stores code for projector image alignment.

FIG. 7 is a block diagram showing computer readable media that stores code for projector image alignment. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media. However, in any case, the computer readable media do not include transitory media such as carrier waves, signals, and the like.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

The various software components discussed herein may be stored on one or more computer readable media 700, as indicated in FIG. 7. For example, a calibration-pattern image comparer 706 can compare, with a processor, a first calibration-pattern image and a second calibration-pattern image. These calibration-pattern images can be captured by cameras in the same device as the projectors. In an example, a stored calibration-pattern image be displayed by a projector and can include sideband information encoded in a pattern of the stored calibration-pattern image. The sideband information includes a synchronization ID value, a color setting, a brightness setting, or other similar adjustable elements of the displayed images relating towards their appearance or alignment and location. The frame rate of the first projector can be used to determine a refresh time that restarts an alignment by the first projector, a camera, and a processor in response to the frame rate completing a cycle. In an example, the processor can also instruct a camera to capture at least a portion of a first displayed calibration-pattern image displayed on the projection surface, the camera to capture at least a portion of a second displayed calibration-pattern image in response to a second projector displaying the stored calibration-pattern image. In an example, the projector identifies itself as an anchor projector and alters the stored calibration-pattern image including an anchor identification in response to the camera returning zero identifications of additional projected images. In an example, the camera can include a camera-rotating mechanism to search for a projected image on a projection surface. In an example, the camera can capture a calibration pattern-image in a camera field that is larger than the projection field of the first projector.

In some examples, a geometric model generator 708 can generate a geometric model of an aligned image for display by both the first projector and a second projector. The geometric model can be generated based on two images captured by cameras of the projectors. The geometric model can be used to make an aligned image for display by both the first projector and the second projector.

In some examples, an aligned image portion sender 710 can send to a first projector a first projector portion of the aligned image based on the geometric model of the aligned image. The first projector may display the calibration-pattern image using infrared light, and further, the camera may capture the infrared light for use in generating the geometric model of the aligned image. The camera can also use wide-angle lenses like fish eye lenses and panoramic cameras.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

While the present techniques have been described with respect to a limited number of embodiments, those skilled in the art can appreciate numerous modifications and variations therefrom. It is intended that the appended claims cover all such modifications and variations as fall within the true spirit and scope of this present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. In yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In the foregoing specification, a detailed description has been given with reference to specific embodiments. It may be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other language does not necessarily refer to the same embodiment or the same example, but may refer to different and distinct embodiments, as well as potentially the sa embodiment.

What is claimed is:

1. A system for projector image alignment comprising:
    a processor to compare a first calibration-pattern image projected by a first projector and at least a portion of a second calibration-pattern image projected by a second projector and generate a geometric model of an aligned image for display by both the first projector and the second projector;
    the processor to send a first projector portion of the aligned image to the first projector based on the geometric model of the aligned image; and
    a camera-rotating mechanism for the first projector that is to rotate the camera to search for a projected image on a projection surface.

2. The system of claim 1, wherein the processor is to send a second projector portion of the aligned image to the second projector based on the geometric model of the aligned image.

3. The system of claim 1, comprising the first projector to display a stored calibration-pattern image in a projection field on a projection surface.

4. The system of claim 3, comprising a camera to capture a portion of the stored calibration-pattern image that is displayed in the projection field displayed on the projection surface.

5. The system of claim 4, wherein the camera is to capture the portion of the second calibration-pattern image in response to the second projector displaying a stored calibration-pattern image.

6. The system of claim 1, wherein the stored calibration-pattern image comprises sideband information encoded in a pattern of the stored calibration-pattern image.

7. The system of claim 6, wherein the sideband information comprises a synchronization ID value.

8. The system of claim 6, wherein the sideband information comprises a color setting and a brightness setting of the aligned image to be projected.

9. The system of claim 1, wherein the projector to identify itself as an anchor projector and to alter the stored calibration-pattern image including an anchor identification in response to the camera returning zero identifications of additional projected images.

10. The system of claim 1, wherein the camera to capture a calibration pattern-image in a camera field, wherein an area of the camera field is greater than an area of the projection field of the first projector.

11. The system of claim 1, wherein:
the first projector to display the calibration-pattern image using infrared light; and
the camera to capture infrared light for use in generating the geometric model of the aligned image.

12. The system of claim 1, wherein the camera comprises a wide angle lens.

13. The system of claim 1, wherein the first projector to project images at a frame rate, the system further comprising the processor to initiate an alignment of the first projector in response to the frame rate completing a cycle.

14. A method for projector image alignment comprising:
comparing, with a processor, a first calibration-pattern image and a second calibration-pattern image;
generating a geometric model of an aligned image for display by both a first projector and a second projector;
sending to a first projector a first projector portion of the aligned image based on the geometric model of the aligned image; and
rotating the camera with a camera-rotating mechanism of the first projector, wherein the camera is to search for a projected image on a projection surface.

15. The method of claim 14, comprising sending, to the second projector, a second projector portion of the aligned image based on the geometric model of the aligned image.

16. The method of claim 14, comprising displaying, with the first projector, a stored calibration-pattern image in a projection field on a projection surface.

17. The method of claim 14, comprising capturing, with a camera, the portion of a first displayed calibration-pattern image displayed on a projection surface, the camera to capture the portion of a second displayed calibration-pattern image in response to the second projector displaying a stored calibration-pattern image.

18. The method of claim 14, wherein a stored calibration-pattern image comprises sideband information encoded in a pattern of the stored calibration-pattern image.

19. The method of claim 14, wherein a projector is to identify itself as an anchor projector and to alter a stored calibration-pattern image including an anchor identification in response to a camera returning zero identifications of additional projected images.

20. A tangible, non-transitory, computer-readable medium comprising instructions that, when executed by a processor, direct the processor to align projector images, the instructions to direct the processor to:
compare a first calibration-pattern image and a second calibration-pattern image;
generate a geometric model of an aligned image for display by both a first projector and a second projector;
send to a first projector a first projector portion of the aligned image based on the geometric model of the aligned image; and
rotate the camera with a camera-rotating mechanism of the first projector, wherein the camera is to search for a projected image on a projection surface.

21. The computer-readable medium of claim 20, wherein the instructions when executed on the processor, send, to the second projector, a second projector portion of the aligned image based on the geometric model of the aligned image.

22. The computer-readable medium of claim 20, wherein the instructions when executed on the processor, display, with the first projector, a stored calibration-pattern image in a projection field on a projection surface.

23. The computer-readable medium of claim 20, wherein the instructions when executed on the processor, capture, with a camera, the portion of a first displayed calibration-pattern image displayed on a projection surface, the camera to capture the portion of a second displayed calibration-pattern image in response to the second projector displaying a stored calibration-pattern image.

24. The computer-readable medium of claim 20, wherein the stored calibration-pattern image comprises sideband information encoded in a pattern of the stored calibration-pattern image.

* * * * *